United States Patent [19]
Kuchuk-Yatsenko et al.

[11] Patent Number: 5,979,738
[45] Date of Patent: Nov. 9, 1999

[54] MACHINE FOR FLASH-BUTT WELDING OF RAILS

[75] Inventors: Sergei I. Kuchuk-Yatsenko; Vassilii A. Sakharnov; Valerii G. Krivenko; Mikhail V. Bogorskii; Fedor K. Porkhun; Victor N. Golovachev; Alexandr P. Miroshnickenko; Victor Gr. Shkurko; Fedor A. Andrienko, all of Kyiv; Yaroslav I. Mikitin, Kakhovka, all of Ukraine

[73] Assignee: E.P. Paton Electric Welding, Ukraine

[21] Appl. No.: 09/019,503

[22] Filed: Feb. 5, 1998

[51] Int. Cl.$^6$ .................................................. B23K 11/04
[52] U.S. Cl. ........................... 228/5.7; 228/19; 228/44.3; 228/125; 219/53; 219/97
[58] Field of Search ................................... 228/125, 212, 228/234.1, 5.7, 19, 44.3, 49.1; 219/53, 97, 100, 101, 104, 108

[56] References Cited

U.S. PATENT DOCUMENTS

| | | | |
|---|---|---|---|
| 3,336,839 | 8/1967 | Welter | 409/300 |
| 4,232,610 | 11/1980 | Theurer | 104/3 |
| 4,236,453 | 12/1980 | Collen | 104/15 |
| 5,147,085 | 9/1992 | Hawkes et al. | 228/115 |

*Primary Examiner*—Samuel M. Heinrich
*Attorney, Agent, or Firm*—Cesari and McKenna, LLP

[57] ABSTRACT

A machine for flash-butt welding of rails, incorporates two tong-type clamping devices made in the form of two two-arm levers carried by a common central axle with insulation from each other and capable of being displaced along the axle relative to each other by two flashing-upsetting hydraulic cylinders connecting them and having bimetal current-carrying rods. Each of the two-arm levers is hinged at one end to the rod or the clamping hydraulic cylinder case, respectively, and the other end is fitted with the clamping and current-carrying jaws. Two welding transformers built into the hollow two-arm levers of one of the two tong-type clamps are joined by current-carrying jumpers through the current-carrying part of the rods of the flashing-upsetting hydraulic cylinders to the current-carrying clamping jaws. A clamping hydraulic cylinder is made with a hydraulic intensifier built into its rod. A reflux valve with a calibrated spring and shank is built into the plunger-rod of the hydraulic intensifier, and a pressure valve is mounted on the hydraulic intensifier cover-lug, this valve being connected by the internal valves with the hydraulic intensifier cavities. The flashing-upsetting hydraulic cylinders being made in the form of tandem-cylinders, wherein two pistons separated by a partition are mounted on a common rod in each hydraulic cylinder.

7 Claims, 3 Drawing Sheets

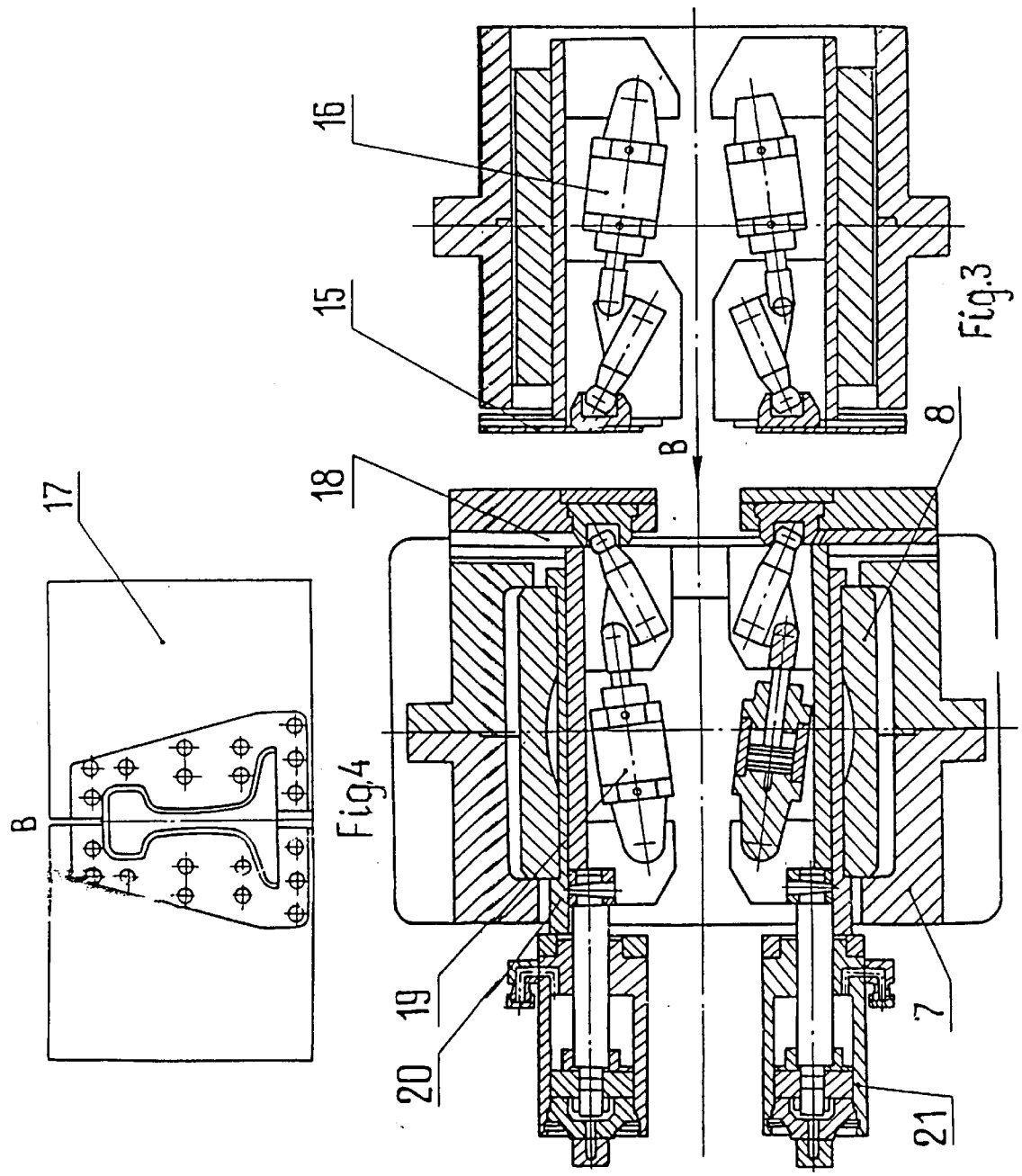

MACHINE FOR FLASH-BUTT WELDING OF RAILS

TECHNICAL FIELD

This invention pertains to the flash-butt welding equipment, and more specifically, to machines with tong-type clamping for rails welding in the field.

BACKGROUND ART

Known is a machine for flash-butt welding of rails (see USSR Auth. Cert. #129758), which incorporates a welding transformer, contact clamping jaws, clamping mechanism with a hydraulic drive and upsetting hydraulic drive fitted with the device for implementing the assigned program of changing the speed of displacement and upsetting of the rails being welded, in which the machine case is made in the form of two tong-type clamps carried by a common axle, and put onto the rails being welded, from the top in the suspended condition.

Known is a flash-butt welding machine (see USSR Auth. Cert. #201561) incorporating two tongue-like clamping devices for mounting and fastening the items being welded, welding transformers with current-carrying clamping jaws and hydraulic drives for clamping and displacement of items in flashing and upsetting, in which the clamping devices are connected to each other by three rods, two of which are located symmetrically relative to the item being welded in one plane with it, and the third central rod which is the axis of rotation of the levers of one of the tong-type clamping devices, passes inside the sleeve which is the axis of rotation of the levers of the second clamping device, the central rod with the sleeve being the guide for relative displacement of the clamping devices.

Known is a device for flash removal from the rails after flash-butt welding, mounted separately from the welding machine and removing the flash in the cold state, which takes a great effort and long time. U.S. Pat. No. 3,336,839 cl.90-24, 1967.

It incorporates the foundation plate, side walls and the cover to which the frame guides are attached. The guide shafts are turned into the side walls. The cutters which remove the flash around the entire rails perimeter, are attached by screws to the mobile elements driven by the hydraulic or pneumatic cylinders through cranks, toothed racks or segments. Such a design of the device allows adjustment of the cutters position, depending on the rails type. The cutter removing the flash from the rails foot, is stationary fixed and does not touch the base metal of the rails.

Known is the device for flash removal from the rails, which is mounted on the tong-type rail welding machines, which consists of the case and three cutters which enclose the rail profile around its entire perimeter, and cut off the flash using the force of the welding machine upsetting cylinders. Here, the upper cutter is made of two parts, rigidly fixed on the case, while two symmetrical side cutters are mounted with the ability of rotation relative to the machine clamping levers, here the upper parts of the side cutters are joined to each other by a hinged tie rod. (USSR Author's Cert. #517429, cl.V23K Nov. 04, 1974 ).

The closest in technical essence, is the machine, described in the book "Equipment for flash-butt welding of rails and its operation", Naukova Dumka Publ. House, Kiev, 1974, p.73–84.

This machine with tong-type clamping, is designed for welding rails under the field conditions and incorporates two tong-type clamping devices carried by the common central axle, and insulated from each other, which are displaced relative to each other by two flashing-upsetting hydraulic cylinders connecting them and mounted in the centre of the cross-section of the rails being welded, with the bimetal current-carrying rods, two welding transformers connected by current-carrying jumpers through the current-carrying part of the rods of the flashing-upsetting hydraulic cylinders, with clamping current-carrying parts of the jaws made in the form of monolithic steel bars with copper deposits in the places of current supply.

Spring-loaded balls are mounted into the clamping jaws, for pressing up the rail with its rolling plane, to the rests mounted on the edges of the tong-type clamps. On the whole, the following drawbacks are found in all the machines for flash-butt welding of rails with tong-type clamping, including the above prototype:

1. Limited forces of upsetting and clamping which allow welding of relatively short rail sections, and do not permit welding of long sections, or welding with pressing up of the rails connected to the ties in track repair with a limitation on time, or welding of the closing butt when laying a seamless track.

2. Poor performance and low reliability are provided by the design in which the bimetal rods of the flashing-upsetting hydraulic cylinders are fastened to the wall of the lever of the stationary tong-type clamp by a ringlike protrusion on the current-carrying part of the rod, and captive ring which draws the rod by the protrusion to the lever wall by bolts, this weakening the wall, providing poor protection for the rod of the flashing-upsetting cylinders from the molten metal spatter, taking up a lot of space in the welding zone. Many machine components have to be disassembled, in order to remove the flashing-upsetting cylinder from the machine.

3. The spring-loaded balls mounted into the clamping jaws, do not ensure a reliable pressing of the rail with its rolling plane, to the rests of the tong-type clamps, which does not provide a good alignment of the rails.

4. Operation of the above devices requires holding for a certain time for strengthening of the welded butt; and than regripping of the clamps with opening of one of the machine clamps, which requires additional time during which the flash cools down, and its removal requires application of a considerable force and high power consumption, thus eliminating the possibility of welding the initially drawn up long rail sections and the closing butt, when laying a seamless track. The quality of flash removal deteriorates, because of the absence of the flash-remover cutters self-positioning.

The basic aim of the invention is development of a machine for flash-butt welding of rails in which: due to adding a new element into the design of the clamping hydraulic cylinder rod, design features of this new element, and new design of the flashing-upsetting hydraulic cylinders (tandem-cylinders), the relatively low pressure of the liquid coming to the clamping cylinder, changes to a higher pressure, without the application of any external supply lines, and, thereby the clamping force becomes greater, and the upsetting force also becomes greater with the application of tandem-cylinder, without increasing the diameters of the flashing-upsetting hydraulic cylinders or the pressure in them, this allowing long sections to be welded, welding with drawing up of the rails fastened to the ties in track repair, and welding of the closing butt when laying a seamless track to be performed, thus widening the functional capabilities of the machine; addition of the flash remover to the machine } and the features of this device design, make possible the self-positioning of the cutters by the rail profile, flash removal in the hot condition from the rails clamped in the machine jaws, right after welding, with a smaller force, thus permitting the welding cycle time to be reduced, i.e. the productivity to be increased and the power consumption for flash removal to be decreased.

DISCLOSURE OF THE INVENTION

The essence of the invention consists in that in the machine for flash-butt welding of rails, incorporating two tong-type clamping devices made in the form of two two-arm levers, carried by a common central axle with insulation from each other, and capable of being displaced along the axle relative to each other by two flashing-upsetting hydraulic cylinders connecting them and having bimetal current-carrying rods; here each of the two-arm levers is hinged at one end to the rod or the clamping hydraulic cylinder case, respectively, and the other end is fitted with the clamping and current-carrying jaws; two welding transformers built into the hollow two-arm levers of one of the two tong-type clamps joined by current-carrying jumpers through the current-carrying part of the rods of the flashing-upsetting hydraulic cylinders to the current-carrying clamping jaws, the clamping hydraulic cylinder being made with the hydraulic intensifier built into its rod, here a reflux valve with a calibrated spring and shank is built into the plunger-rod of the hydraulic intensifier, and a pressure valve is mounted on the hydraulic intensifier cover-lug, this valve being connected by the internal valves with the hydraulic intensifier cavities, both flashing-upsetting hydraulic cylinders being made in the form of tandem-cylinders, here two pistons separated by a partition, are mounted on a common rod in each hydraulic cylinder.

Due to the fact that the clamping hydraulic cylinder is made with the hydraulic intensifier built into its rod, and the reflux valve with the calibrated spring and shank is built into the plunger-rod of the hydraulic intensifier, with the pressure valve mounted on the cover-lug of the hydraulic intensifier, this valve being connected with the hydraulic intensifier cavities by internal valves, the clamping cylinder is made with the capability of automatic multiplication of entering liquid of the relatively low-pressure into a higher pressure liquid, without any external supply lines, this permitting a considerable increase of the clamping force without increasing the clamping hydraulic cylinder diameter.

Due to the fact that both flashing-upsetting hydraulic cylinders are made in the form of tandem-cylinders, and here in each of the hydraulic cylinders two pistons separated by a partition are mounted on a common rod, the upsetting force is increased and without increasing the cylinder diameter or the pressure in it, it is possible to keep the same distance from the rail foot to the lowest point of the machine design, which is the bottom of the upsetting cylinder, this determining the height of the rail lifting above the railway bed. All this permits welding long sections of rails and the closing butt of the seamless track, i.e. widens the functional capabilities of the machine.

The essence of the invention also consists in that the alignment hydraulic cylinders are mounted between the two-arm levers of the tong-type clamps, the cylinder rods being rigidly fastened, one of them directly on the central axle, and the other on the sleeve put on the central axle, while the alignment hydraulic cylinder proper is hinged to two levers, the lower ends of which are made in the form of hooks, here the clamping devices have rests mounted on the central axle, and the pins capable of moving in the lever slots, are mounted on the two-arm lever of the clamping devices. This allows a more reliable alignment of the rails along the rolling plane, independently of clamping.

Besides, the essence of the invention consists in that the machine is additionally fitted with a flash-remover which consists of three cutters for enclosing the rail profile around the entire perimeter, with the two side cutters being installed with the ability of turning relative to one tong-type clamp, hinged to the upper third cutter and fastened on the rods of the two additional hydraulic cylinders built into the clamping levers of one of the two tong-type clamps of the welding machine, here each rod of the additional hydraulic cylinders is made of two parts hinged to each other, the part of the rod to which the side cutters are fastened, has the ability of rotation relative to the part of the rod, to which the pistons of the additional hydraulic cylinders are fastened. Due to the fact that the machine additionally incorporates the flash-remover consisting of three cutters for enclosing the rail profile around the entire perimeter, that the operations of welding and flash removal are combined in one machine, the functional capabilities of the machine are thereby expanded.

Due to the fact that the flash-remover incorporates two additional hydraulic cylinders located in the clamping levers of one of the tong-type clamps, and the two side cutters are fastened to them, the holding time for strengthening of the welded butt after welding, is eliminated, as well as the need for reclamping the rail, when shifting from one technological operation to another, namely when going over from welding to flash removal, i.e. the rail remains in the same fixed position in which it was during welding. This is especially important in welding the long rail sections and the closing butt, when laying a seamless track. In this connection, the flash is cut off in the hot condition, right after welding with a force smaller than in the device selected as a prototype and with lower power consumption. The process efficiency here is increased.

Due to the fact that each rod of the additional hydraulic cylinders is made of two parts hinged to each other and the part of the rod, which carries the cutters, has the capability of axial rotation relative to the part of the rod, which carries the pistons, the cutters are capable of self-positioning by the rail profile.

This enables the flash to be removed with a higher quality.

BRIEF DISCRIPTION OF THE DRAWINGS

All the above is explained in the following drawings:

FIG. 3 is a B—B cut through the upsetting cylinder, FIG. 1.

FIG. 4 is an A—A cut through the clamping cylinder, FIG. 2.

FIG. 5 is a C—C cut along the central axis, FIG. 1.

FIG. 6 is extension D, FIG. 3.

FIG. 7 are clamping and contact jaws, view E, FIG. 3.

FIG. 8 is F—F section across the contact jaws, FIG. 7.

FIG. 9 is G—G section across the pressing-up mechanism, FIG. 1.

FIG. 10 is the view of flash-remover along H arrow, FIG. 3.

Figure 1:
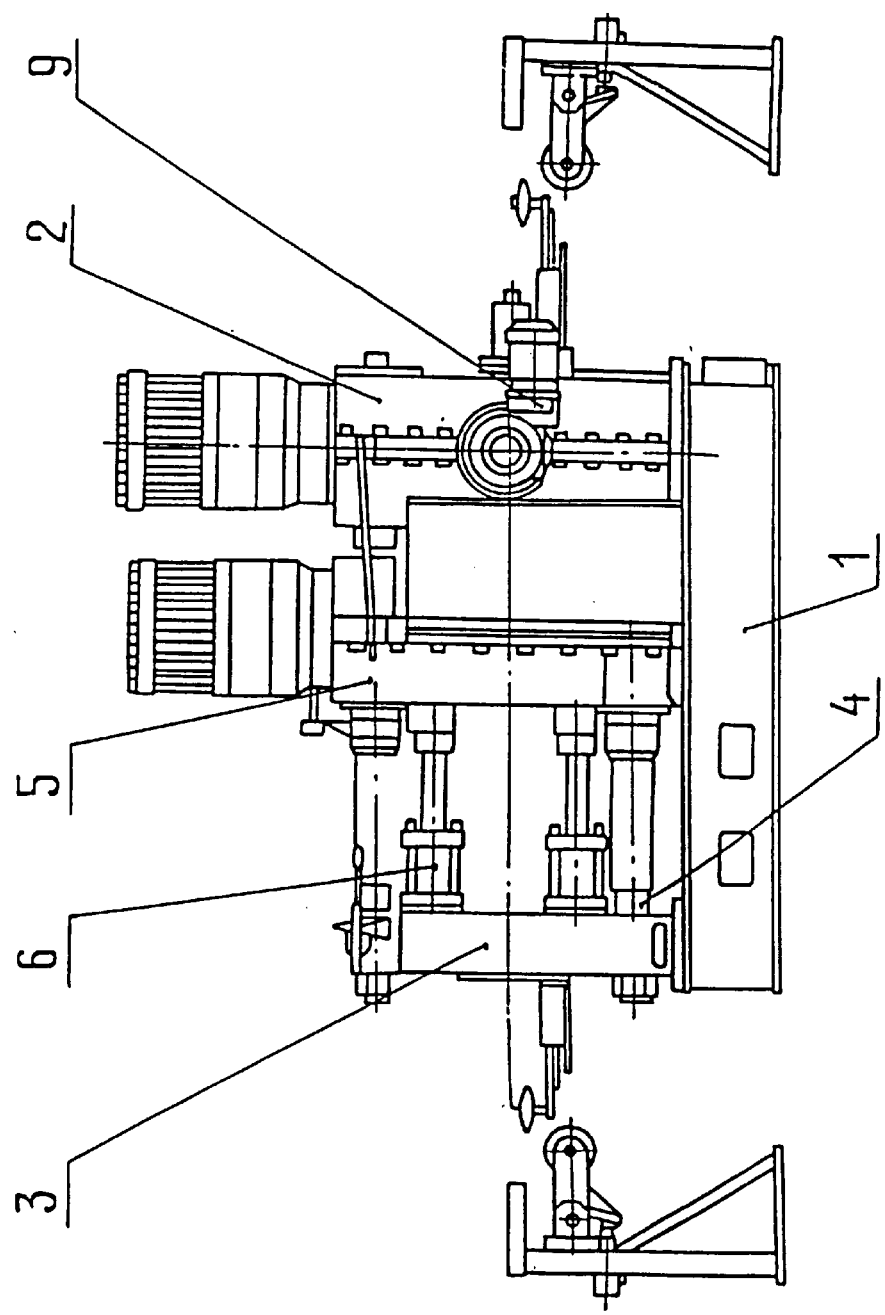
FIG. 1 shows the described machine, side view.
Figure 1:
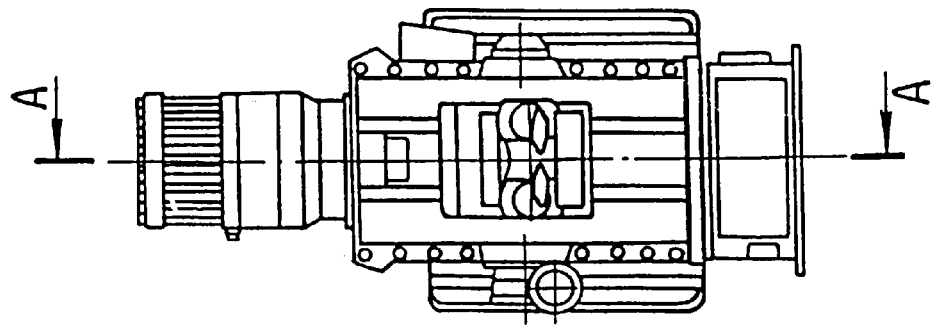
Figure 2:
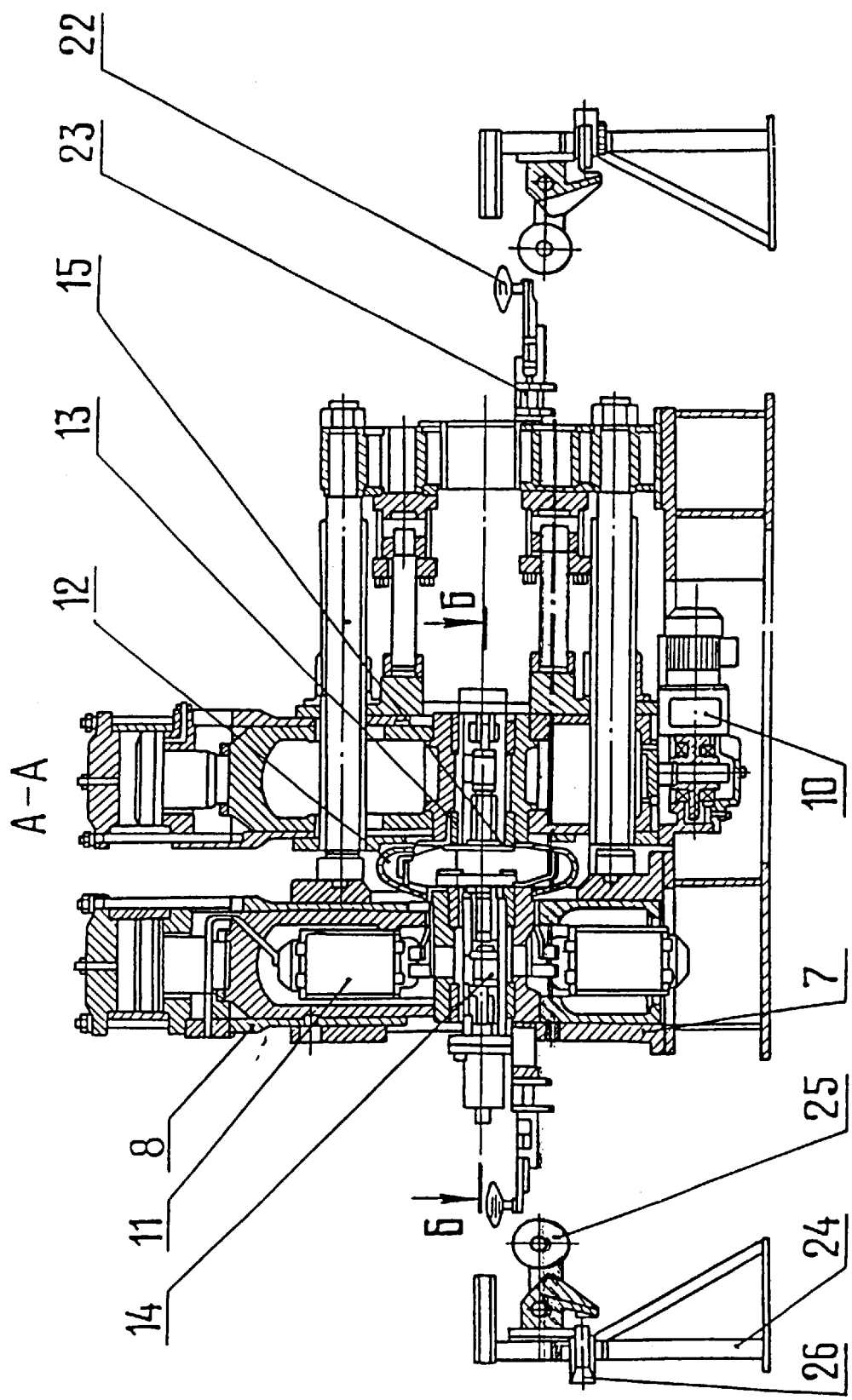
FIG. 2 is the end face view.

The machine consists of two tong-type clamping devices 1 and 2, (FIG. 1). Each tong-type clamp consists of two two-arm levers 3 and 4 (FIG. 2), put on the common central axle 5, with the capability of relative displacement of the tong-type clamps over it, driven by two flashing-upsetting cylinders 6 which connect them and have bimetal current-carrying rods 7 (FIG. 3). The tong-type clamps 1 and 2 are insulated from each other along all the three rods connecting them, each of the two-arm levers 3, 4 (FIG. 2) is hinged by one end to the rod or case of the clamping hydraulic cylinders 8, respectively, and the other end is fitted with the clamping 9 and current-carrying 10 jaws (FIG. 3). Two welding transformers 11 (FIG. 3) are built into the two-arm levers of one of the tong-type clamps, in particular 3 and 4, and connected by current-carrying jumpers 12 and 13 through the current-carrying part of the bimetal rods 7 of flashing hydraulic cylinders 6 with the current-carrying jaws 10. Each clamping hydraulic cylinder 8 (FIG. 4) consists of case 14, working piston with rod 15, here the rod of piston 15 simultaneously is the hydraulic intensifier cylinder, into which piston 16 and plunger 17 are built, the ratio of the squares of piston 16 and plunger 17 corresponding to the rise of pressure under the working piston 15. A reflux valve 18 with spring 19 calibrated for the required pressure, is built into plunger 17 of the hydraulic intensifier, the reflux valve 18 having a shank 20 which opens the reflux valve, when plunger 17 is in the extreme right initial position, resting against the cover-lug 21 of hydraulic intensifier.

For automatic switching of the pressure of oil fed by the oil pump into the working main line, into the multiplication pressure, the pressure valve 22 is mounted on the cover-lug 21, which is connected by inner channels "a" and "b" with the hydraulic intensifier cavities "α" and "γ". The pressure valve 22 consists of case 23, slide valve 24, calibrated spring 25 and reflux valve 26.

The flashing-upsetting hydraulic cylinders 6 (FIG. 3) are made in the form of tandem hydraulic cylinders. Here, in each hydraulic cylinder two pistons 27 and 28 are mounted on a common rod, separated by partition 29. The flashing-upsetting hydraulic cylinders 6 are connected by common piping and work in parallel, driven by the servo drive or hydraulic amplifier, according to a preset program from the commands unit (not shown in the drawing). In flashing and upsetting, the oil is fed simultaneously into cavities "ε" and "η", when drawing the jaws apart, it is fed into cavities "ν" and "ι".

The bimetal rods 7 of flashing-upsetting hydraulic cylinders consist of two parts: the bronze current-conducting part 30 and the steel part 31 (FIG. 4), which are joined by a threaded connection; the bronze current-carrying part of rods 30 being water-cooled and sealed with rubber rings 32. The bronze current-carrying part of rods 30 has a recess, into which two semirings 33 are inserted (FIG. 6), being fastened in the recess by a monolithic removable ring 34. Here, rod 7 with its current-carrying part is inserted into the holes of the wall of the two-arm levers 3 and 4 of the stationary tong-type clamp 1 on insulation, until it rests against semi-ring 33 and is tightened with nut 35. The clamping steel jaws 9 and contact bronze jaws 10 are made separate, and each consists of two parts (FIGS. 7–8), base 36 and quickly-removed insert 37 made to accommodate the rail web profile. Here, the base of the bronze jaws has drilled holes through which cooling water is running.

The hydraulic cylinders 38 for rails alignment are located between the two-arm levers of the clamping mechanisms (FIG. 9). The rod of the alignment hydraulic cylinder 39 is fastened to the central axle 5 (FIGS. 2 and 5) or sleeve 40; respectively. The alignment cylinder is hinged to the two levers 41, which with their middle part are connected with axles 42 fastened to the two-arm levers of the clamping mechanisms, have a longitudinal slot and the capability of vertical displacement, and during the upward travel of the pressing-up hydraulic cylinder, are capable of clamping the rail head with the lower ends of levers 41 made in the form of hooks, and pressing the rail with its rolling plane to the rests of the tong-type clamps 43, thus positioning them in one plane.

The flash remover (FIG. 10) is built into two two-arm levers of the tong-type clamps of the welding machine and consists of three cutters, two side cutters 44 and 45 and one upper cutter 46 hinged with the side cutters and completely enclosing the rail profile, side cutters 44 and 45 being connected with rods 47 of hydraulic cylinders 48 (FIG. 3), and built into the two-arm levers. Rods 47 of hydraulic cylinders 48 consist of two parts hinged to each other, the part of the rod to which side cutters are fastened, has the capability of rotation relative to the part of the rod to which pistons are fastened, thus positioning itself by the rail profile.

The hinged joint of the upper cutter 46 with side cutters 44 and 45, enables the side cutters, with their lower parts shearing the flash from the rail foot, to pass freely under the rail foot, when closing and opening the tong-type clamps of the welding machine.

The synchronous displacement of the hydraulic cylinders pistons, during flash removal, and, therefore, of all the three cutters, is achieved by connecting into the line for feeding fluid to hydraulic cylinders 48, the flow dividing valve known in hydraulics (not shown in the drawing).

Working of the Machine

The machine operates as follows:

In the initial position, before clamping of the ends of the rails being welded, the tong-type clamps 1 and 2 are separated, while their two-arm levers 3, 4 are open, the intensifier plunger 17 is in the extreme right position and reflux valve 18 is open. The clamping slide valve is in the neutral position (machine hydraulic diagram is not shown). The machine is lowered with its clamping jaws onto the rails with the ends 36 scraped for contacts, the clamping slide valve is moved into "clamping" position, the oil from the oil pump with the pressure $P_1$ set by the reducing valve, comes by the piping simultaneously to two pressure valves 22 (clamping of both rail ends takes place simultaneously) and comes to cavity "γ" through channels "c" and "a", while through the open reflux valve 18 through the drilling in the intensifier plunger, it comes to cavity "λ" under the working piston 15; piston 15, together with the rods, starts moving apart, while rotating two-arm levers 3, 4 around the central axle 5, gradually clamping the rail ends by the web with contact 10 and clamping 9 jaws, with the force proportional to oil pressure in the main line P multiplied by the area of working piston 15; simultaneously oil under $P_1$ pressure comes by channel "b" under slide valve 24 into cavity "α", and after full pressure $P_1$ has been reached, and this pressure rises as clamping is performed, compresses calibrated spring 25 and moves slide valve 24 to the right, thus letting the oil come through channel "b" to the intensifier cavity "α" under piston 16; piston 16, together with plunger 17, starts moving to the left, shank 20 will move away from cover-lug 21 and reflux valve 18 will close, pressure in cavity "λ" under piston 15 will rise and reach multiplication pressure equal to pressure $P_1$ multiplied by the difference of the squares of diameters of piston 16 and plunger 17, thus bringing about the final clamping of rails with a force proportional to multiplication pressure.

After completion of rails clamping, a signal is fed for starting the flashing and subsequent upsetting which are run automatically by the preset program, here the oil under $P_1$ pressure simultaneously penetrates into cavities "ε" and "η" (FIG. 3) of both flashing-upsetting hydraulic cylinders 6, and by means of bimetal rods 7 draws both tong-type clamps 1 and 2 towards each other, flashing takes place, and upsetting (fast drawing together of the surface melted rail ends) is performed at the moment preset by the program. After completion of welding, the flash is cut off (metal oxides and part of weld reinforcement are removed).

The device for flash cutting off from the rails operates as follows. When the rails are clamped by tong-type clamps, the device cutters completely enclose the rail profile, here side cutters 44 and 45 (FIG. 10) due to the ability to turn around the axis of hydraulic cylinders 48 (FIG. 3), position themselves to accommodate the rail profile. After completion of rail welding, when the flash is still in the hot state with the rail clamped in the machine jaws, a signal for the flash cutting off is issued, and the liquid, through the flow dividing valve comes to the piston cavities of the hydraulic cylinders 48 for flash cutting off, the hydraulic cylinders pistons, together with rods 4 and cutters 44, 45 and 46 (FIG. 10), move in synchronism along the rail, cutting off the flash in the hot condition. After the flash has been cut off, the tong-type clamps of the machine, together with cutters 44, 45 and 46, are opened, releasing the rail. The pistons of hydraulic cylinders 48, together with the rods and cutters, are returned to the initial position.

A signal is given for releasing the rails from clamping. The clamping slide valve (not shown in the drawings) is moved into the "open" position, channel "c" of pressure valve 22 is connected to the drain line, while the pressure of the main line $P_1$ is applied to channel "q" of clamping hydraulic cylinder 8, oil comes to cavity "σ", piston 15 and hydraulic cylinder case 14 are drawn together, turning the two-arm levers 3, 4 around the central axle 5, thus releasing the welded rail from the clamping and contact jaws 9 and 10, simultaneously oil under pressure $P_1$ comes, through the channel of piston 15 to cavity "φ" of intensifier, drawing apart piston 16 and plunger 17 of intensifier to the extreme right position, shank 20 resting against cover-lug 21, will compress calibrated spring 21 and open valve 18. At the end of the opening process, working piston 15 moves to the extreme left position, while piston 16 and plunger 17 move to the extreme right position. By switching the reversible slide valve to drawing apart, the oil from flashing-upsetting cylinders from cavities "ε" and "η" is connected to drain, and is supplied under pressure $P_1$ to cavities "v" and "ι", thereby the tong-type clamps 1 and 2 are drawn apart relative to each other and moved to the initial position.

We claim:

1. A machine for flash-butt welding of rails having two tong-type clamping devices made in the form of two two-arm levers carried by a common central axle with insulation from each other and displaced along the axle relative to each other by two flashing-upsetting hydraulic cylinders connecting them and having bimetal current-carrying rods, each of the two-arm levers hinged at one end to a respective rod or a case of a respective clamping hydraulic cylinder and fitted at the other end with clamping and current-carrying jaws, two welding transformers built into the two-arm levers of one of the two tong-type clamping devices and joined by current-carrying jumpers through a current-carrying part of the rods of the flashing-upsetting hydraulic cylinders to the current-carrying jaws, the machine comprising:

a hydraulic intensifier built into the rod of the respective clamping hydraulic cylinder, the hydraulic intensifier having a plunger-rod comprising a reflux valve with a calibrated spring and shank built therein, and a pressure valve mounted on a cover-lug of the hydraulic intensifier, the valve connected by internal valves with cavities of the hydraulic intensifier, wherein the flashing-upsetting hydraulic cylinders are made in the form of tandem-cylinders, each cylinder comprising two pistons mounted on a common bimetal current-carrying rod and separated from the other cylinder by a partition.

2. The flash-butt welding machine of claim 1 wherein each clamping jaw comprises an internal current-carrying bronze part and an outer steel part, each of the bronze and the steel parts of the jaws further comprising a base and an replaceable wearing part inserted into the base, the bronze part base being fitted with a cooling system.

3. The flash-butt welding maching of claim 1 further comprising hydraulic cylinders for rails alignment mounted between the two-arm levers, the alignment hydraulic cylinders having rods rigidly fastened one of directly on the central axle and on a sleeve sitting on the central axle, the alignment hydraulic cylinder hinged to two levers having pins mounted thereon and lever slots, the lower ends of the levers made in the form of hooks, wherein the clamping devices have rests mounted on the central axle and the pins are capable of moving in the lever slots.

4. The flash-butt welding machine of claim 1 further comprising a flash-remover having three cutters for enclosing a rail profile around an entire perimeter, the cutters including two side cutters configured to turn relative to one tong-type clamp, the side cutters hinged to an upper third cutter and fastened on rods of two additional hydraulic cylinders built into the levers of one of the two tong-type clamping devices, each rod of the additional hydraulic cylinders comprising two parts hinged to each other, the part of the rod on which the side cutters are fastened having an ability of rotation relative to the part of the rod on which pistons of the additional hydraulic cylinders are fastened.

5. The flash-butt welding maching of claim 2 further comprising hydraulic cylinders for rails alignment mounted between the two-arm levers, the alignment hydraulic cylinders having rods rigidly fastened one of directly on the central axle and on a sleeve sitting on the central axle, the alignment hydraulic cylinder hinged to two levers having pins mounted thereon and lever slots, the lower ends of the levers made in the form of hooks, wherein the clamping devices have rests mounted on the central axle and the pins are capable of moving in the lever slots.

6. The flash-butt welding machine of claim 2 further comprising a flash-remover having three cutters for enclosing a rail profile around an entire perimeter thereof, the cutters including two side cutters configured to turn relative to one tong-type clamp, the side cutters hinged to an upper third cutter and fastened on rods of two additional hydraulic cylinders built into the levers of one of the two tong-type clamping devices, each rod of the additional hydraulic cylinders comprising two parts hinged to each other, the part of the rod on which the side cutters are fastened having an ability of rotation relative to the part of the rod on which pistons of the additional hydraulic cylinders are fastened.

7. The flash-butt welding machine of claim 3 further comprising a flash-remover having three cutters for enclosing a rail profile around an entire perimeter thereof, the cutters including two side cutters configured to turn relative to one tong-type clamp, the side cutters hinged to an upper third cutter and fastened on rods of two additional hydraulic cylinders built into the levers of one of the two tong-type clamping devices, each rod of the additional hydraulic cylinders comprising two parts hinged to each other, the part of the rod on which the side cutters are fastened having an ability of rotation relative to the part of the rod on which pistons of the additional hydraulic cylinders are fastened.

* * * * *